United States Patent
Contreras et al.

(10) Patent No.: US 10,585,984 B2
(45) Date of Patent: Mar. 10, 2020

(54) TECHNIQUES FOR IMPROVING INPUT TEXT PROCESSING IN A DATA PROCESSING SYSTEM THAT ANSWERS QUESTIONS

(71) Applicant: INTERNATIONAL BUSINESS MACHINES CORPORATION, Armonk, NY (US)

(72) Inventors: David Contreras, Apex, NC (US); Robert C. Sizemore, Fuquay-Varina, NC (US); Sterling R. Smith, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 234 days.

(21) Appl. No.: 14/937,431

(22) Filed: Nov. 10, 2015

(65) Prior Publication Data

US 2017/0132187 A1 May 11, 2017

(51) Int. Cl.
*G06F 17/27* (2006.01)
*G06F 17/24* (2006.01)
*G06N 5/02* (2006.01)

(52) U.S. Cl.
CPC ........ *G06F 17/2705* (2013.01); *G06F 17/273* (2013.01); *G06F 17/276* (2013.01); *G06F 17/24* (2013.01); *G06F 17/274* (2013.01); *G06F 17/2785* (2013.01); *G06N 5/02* (2013.01)

(58) Field of Classification Search
CPC ...... G06F 17/24; G06F 17/273; G06F 17/274; G06F 17/30675; G06F 17/30684; G06F 17/2785; G06F 17/3053; G06N 5/02; G06N 99/005

See application file for complete search history.

(56) References Cited

U.S. PATENT DOCUMENTS

| 5,519,608 A * | 5/1996 | Kupiec ............... G06F 17/3064 704/9 |
| 7,139,752 B2 * | 11/2006 | Broder .............. G06F 17/30616 |
| 8,280,838 B2 | 10/2012 | Ferrucci et al. |

(Continued)

OTHER PUBLICATIONS

System and Method for Log Analysis and Correlation, Anonymously; Jul. 5, 2012.

(Continued)

*Primary Examiner* — Quoc A Tran
(74) *Attorney, Agent, or Firm* — Michael R. Long; Diana Roberts Gerhardt

(57) ABSTRACT

A technique of improving input text processing in a data processing system that answers questions includes receiving a question from a user. The question has associated supporting original input text that is utilized in answering the question. Corrective measures are applied to the supporting original input text to create supporting revised input text. The supporting revised input text documents corrective measures applied to the supporting original input text. An answer to the question is generated based on, at least in part, the supporting revised input text. The supporting original input text is recreated from the supporting revised input text based on the documented corrective measures in the supporting revised input text subsequent to generating the answer. The answer and the supporting original input text as recreated are transmitted to the user.

17 Claims, 8 Drawing Sheets

(56) References Cited

U.S. PATENT DOCUMENTS

| | | | |
|---|---|---|---|
| 2008/0177702 A1* | 7/2008 | Morgan | G06F 19/00 |
| 2009/0287678 A1* | 11/2009 | Brown | G06F 17/30654 |
| 2009/0292687 A1 | 11/2009 | Fan et al. | |
| 2010/0235164 A1* | 9/2010 | Todhunter | G06F 17/279 |
| | | | 704/9 |
| 2012/0078902 A1 | 3/2012 | Duboue et al. | |
| 2012/0084076 A1* | 4/2012 | Boguraev | G06F 17/2735 |
| | | | 704/9 |
| 2013/0007037 A1* | 1/2013 | Azzam | G06F 17/30654 |
| | | | 707/769 |
| 2014/0272885 A1* | 9/2014 | Allen | G09B 7/00 |
| | | | 434/322 |

OTHER PUBLICATIONS

Method and Apparatus for Mobile Information Retrieval on the Open Web, Anonymously; Jan. 19, 2011.

* cited by examiner

Patient 'A' supporting original input text file 600

<start>
The patient has a BMI of 3.2.
The patient has been vaccinated against hepatitis A and B.
The patient does not smoke The patient does not drink
The patient has been taking medicine 'A' for the past6months.
The patient's DOB:1990/2/48.
The patient's hemogoblin count is 11.5 gm/dl.
The patient's temperature was 98.7°.
<end>

FIG. 6A

Patient 'A' supporting revised input text file 602

<start>
The patient has a *BMI* body mass index of 3.2.
*The patient has been vaccinated against hepatitis A and B.*
The patient does not smoke. The patient does not drink.
The patient has been taking medicine 'A' for the *past6months* past 6 months.
The patient's *DOB* date of birth: 1990/2/48.
The patient's *hemogoblin* hemoglobin count is 11.5 gm/dl.
The patient's temperature was 98.7° 98.7 degrees.
<end>

FIG. 6B

Procedure 'B' file 604
<start>
Patient body mass index must be less than 3.6.
Patient cannot smoke.
Patient cannot drink.
Patient must have been taking medicine 'A' for at least the past three months.
Patient must be less than 70 years old.
Patient's hemoglobin count must be between 11.0 gm/dl and 12.0 gm/dl.
Patient's temperature must be between 97.5 degrees and 99.7 degrees.
<end>

FIG. 6C

Patient 'A' supporting original input text file 606
<start>
The patient has a BMI of 3.2.
The patient has been vaccinated against hepatitis A and B.
The patient does not smoke The patient does not drink
The patient has been taking medicine 'A' for the past6months.
The patient's DOB:1990/2/48.
The patient's hemogoblin count is 11.5 gm/dl.
The patient's temperature was 98.7°.
<end>

FIG. 6D

TECHNIQUES FOR IMPROVING INPUT TEXT PROCESSING IN A DATA PROCESSING SYSTEM THAT ANSWERS QUESTIONS

BACKGROUND

The present disclosure is generally directed to input text processing and, more particularly, to techniques for improving input text processing in a data processing system that answers questions.

Watson is a question answering (QA) system (i.e., a data processing system) that applies advanced natural language processing (NLP), information retrieval, knowledge representation, automated reasoning, and machine learning technologies to the field of open domain question answering. In general, conventional document search technology receives a keyword query and returns a list of documents, ranked in order of relevance to the query (often based on popularity and page ranking). In contrast, QA technology receives a question expressed in a natural language, seeks to understand the question in greater detail than document search technology, and returns a precise answer to the question.

The Watson system reportedly employs more than one-hundred different algorithms to analyze natural language, identify sources, find and generate hypotheses, find and score evidence, and merge and rank hypotheses. The Watson system implements DeepQA™ software and the Apache™ unstructured information management architecture (UIMA) framework. Software for the Watson system is written in various languages, including Java™ C++, and Prolog, and runs on the SUSE™ Linux Enterprise Server 11 operating system using the Apache Hadoop™ framework to provide distributed computing. As is known, Apache Hadoop is an open-source software framework for storage and large-scale processing of datasets on clusters of commodity hardware.

The Watson system employs DeepQA software to generate hypotheses, gather evidence (data), and analyze the gathered data. The Watson system is workload optimized and integrates massively parallel POWER7® processors. The Watson system includes a cluster of ninety IBM Power 750 servers, each of which includes a 3.5 GHz POWER7 eight core processor, with four threads per core. In total, the Watson system has 2,880 POWER7 processor cores and has 16 terabytes of random access memory (RAM). Reportedly, the Watson system can process 500 gigabytes, the equivalent of one million books, per second. Sources of information for the Watson system include encyclopedias, dictionaries, thesauri, newswire articles, and literary works. The Watson system also uses databases, taxonomies, and ontologies.

Cognitive systems learn and interact naturally with people to extend what either a human or a machine could do on their own. Cognitive systems help human experts make better decisions by penetrating the complexity of 'Big Data'. Cognitive systems build knowledge and learn a domain (i.e., language and terminology, processes and preferred methods of interacting) over time. Unlike conventional expert systems, which have required rules to be hard coded into an expert system by a human expert, cognitive systems can process natural language and unstructured data and learn by experience, similar to how humans learn. While cognitive systems have deep domain expertise, instead of replacing human experts, cognitive systems act as a decision support system to help human experts make better decisions based on the best available data in various areas (e.g., healthcare, finance, and customer service).

A common analysis structure (CAS) is an object-based data structure that logically contains documents to be analyzed and interfaces with the UIMA framework. Analysis engines may present and share their results in a CAS, which can represent, for example, objects, properties, and values. Object types can be related to each other in a single inheritance hierarchy. Analysis engines may share and record their analysis results in terms of an object model within a CAS. In general, a CAS stores arbitrary data structures that represent document analysis.

BRIEF SUMMARY

Disclosed are a method, a data processing system, and a computer program product (embodied in a computer-readable storage device) for improving input text processing.

A technique of improving input text processing in a data processing system that answers questions includes receiving a question from a user. The question has associated supporting original input text that is utilized in answering the question. Corrective measures are applied to the supporting original input text to create supporting revised input text. The supporting revised input text documents corrective measures applied to the supporting original input text. An answer to the question is generated based on, at least in part, the supporting revised input text. The supporting original input text is recreated from the supporting revised input text based on the documented corrective measures in the supporting revised input text subsequent to generating the answer. The answer and the supporting original input text, as recreated, are transmitted to the user.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

The above as well as additional objectives, features, and advantages of the present invention will become apparent in the following detailed written description.

BRIEF DESCRIPTION OF THE DRAWINGS

The description of the illustrative embodiments is to be read in conjunction with the accompanying drawings, wherein:

FIG. 6A is a diagram illustrating content of an exemplary original input text file containing personal health information of a Patient 'A';

FIG. 6B is a diagram illustrating content of an exemplary revised input text file containing personal health information of Patient 'A';

FIG. 6C is a diagram illustrating content of an exemplary Procedure 'B' file;

FIG. 6D is a diagram illustrating content of an exemplary original input text file containing personal health information of Patient 'A' in which selected personal health information is identified (e.g., highlighted)

DETAILED DESCRIPTION

Figure 1:
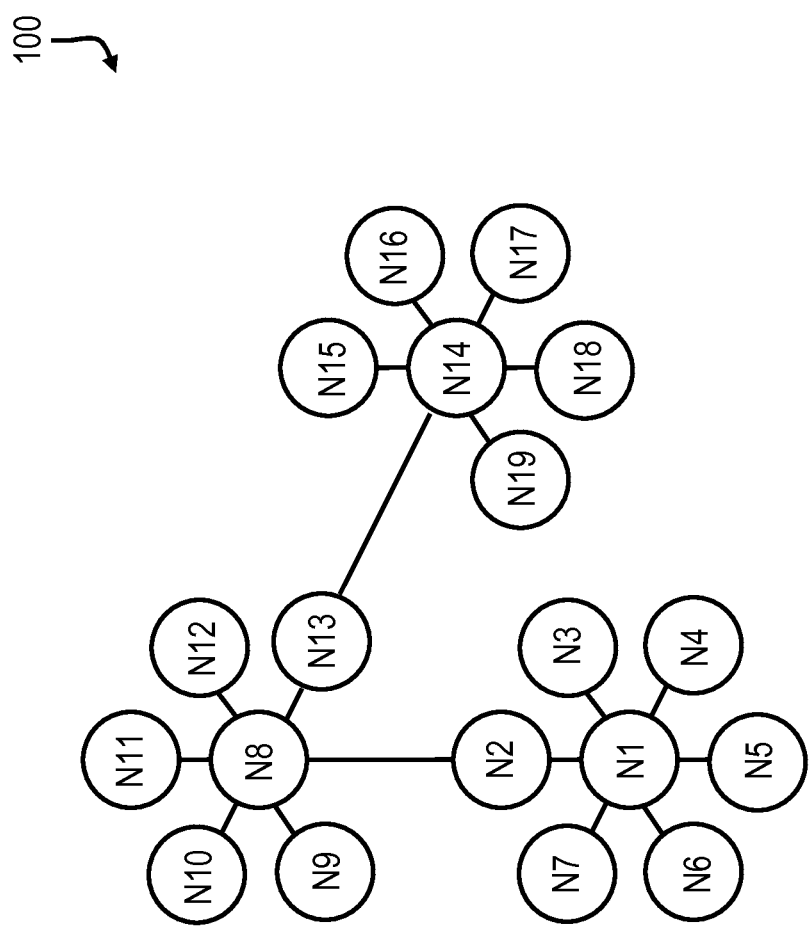
FIG. 1 is a diagram of an exemplary high performance computing (HPC) cluster that includes a number of nodes, with one or more of the nodes including multiple processors that are configured to function as a question answering (QA) system, according to various aspects of the present disclosure.

The illustrative embodiments provide a method, a data processing system, and a computer program product (embodied in a computer-readable storage device) for improving input text processing, by addressing issues in the input text prior to processing the input text.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined by the appended claims and equivalents thereof.

It is understood that the use of specific component, device and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that term is utilized. As may be utilized herein, the term 'coupled' encompasses a direct electrical connection between components or devices and an indirect electrical connection between components or devices achieved using one or more intervening components or devices. As may be used herein, the terms 'data' and 'evidence' are interchangeable.

As previously mentioned, a common analysis structure (CAS) is an object-based data structure that logically contains documents to be analyzed and interfaces with the UIMA framework. Analysis engines may present and share their results in a CAS, which can represent, for example, objects, properties, and values. Object types can be related to each other in a single inheritance hierarchy. Analysis engines may share and record their analysis results in terms of an object model within a CAS. In general, a CAS stores arbitrary data structures that represent document analysis. As one example, for each person that is found in a document body, an analysis engine may create a person object in a CAS and link the person object to a span of text in which the person is mentioned in the document. A CAS can be thought of as a general-purpose representational structure. Within the UIMA framework, however, basic types that are defined can be extended to define a rich type system, which can be considered as an object schema for a CAS.

As is known, QA system pipelines may receive unstructured input text that has inconsistencies that, if not addressed, can cause issues in QA system pipeline processing. For example, abbreviations, irrelevant information, misspelled words, anomalies, and bad grammar in input text can cause issues in QA system pipeline processing. According to an aspect of the present disclosure, upon receipt, original data is revised within a framework that applies corrective measures (e.g., patterns) to the original data. The revised data is then processed by a QA system pipeline. Annotations (e.g., strike-through, underlining, etc.) are maintained in the revised data to facilitate recreation of the original data from the revised data, such that a user may be supplied the original data in conjunction with an answer to an associated user question.

As one example, original text (provided by a user) may be pulled from a given view in a common analysis structure (CAS). Patterns may then be applied to the original text to produce revised text (from the original text) that addresses any issues in the original text. The revised text may then be used to create a new CAS that is processed by a QA system pipeline. Annotations in the revised text may then be used to recreate the original text at the end of a QA system pipeline before output from the QA system pipeline is returned to the user.

As text within a CAS view is immutable (i.e., unchanging over time), a pre-parse framework may be employed to create a new view in a CAS with modified input text that is generated by applying one or more pre-parse patterns to original input text to facilitate QA system pipeline processing. In various embodiments, annotations are created that allow the framework to restore the state of the CAS view when QA system pipeline processing is complete. In this manner, modification of original input text per domain processing requirements may be performed without forcing domain processing requirements on an originator of the original input text. The disclosed techniques may, for example, be implemented for security reasons, among other reasons.

Conventionally, the Watson system has explored large amounts of structured and unstructured data to find candidate answers for a question (or a problem). According to various aspects of the present disclosure, techniques for performing high performance computing (HPC), or network computing, are described herein that facilitate improved input text processing in a data processing system that answers questions. With reference to FIG. 1, an example topology for a relevant portion of an exemplary HPC cluster (supercomputer) 100 includes a number of nodes (N1-N18) that are connected in, for example, a three-dimensional (3D) Torus topology. Each of the nodes (N1-N18) may include one or more symmetric multiprocessors (SMPs). While eighteen nodes are illustrated in FIG. 1, it should be appreciated that more or less than eighteen nodes may be present in an HPC cluster configured according to the present disclosure.

Figure 2:
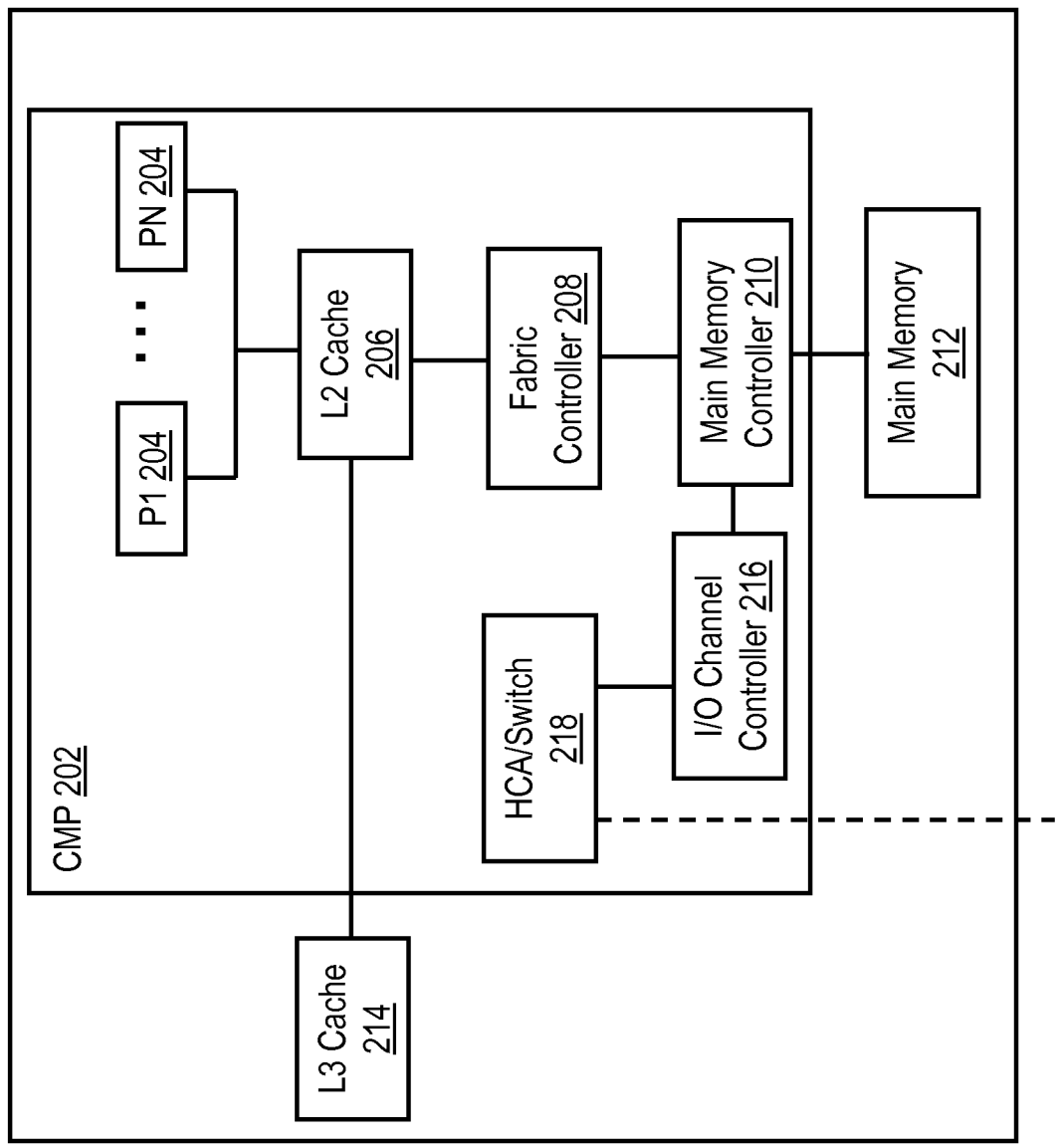
FIG. 2 is a diagram of a relevant portion of an exemplary symmetric multiprocessor (SMP) data processing system included in one of the nodes of FIG. 1, according to an embodiment of the present disclosure.

With reference to FIG. 2, each of the nodes N1-N18 of FIG. 1 may include a processor system, such as data processing system 200. As is illustrated, data processing system 200 includes one or more chip-level multiprocessors (CMPs) 202 (only one of which is illustrated in FIG. 2), each of which includes multiple (e.g., eight) processors 204. Processors 204 may, for example, operate in a simultaneous multithreading (SMT) mode or a single thread (ST) mode. When processors 204 operate in the SMT mode, processors 204 may employ multiple separate instruction fetch address registers to store program counters for multiple threads.

In at least one embodiment, processors 204 each include a first level (L1) cache (not separately shown in FIG. 2) that is coupled to a shared second level (L2) cache 206, which is in turn coupled to a shared third level (L3) cache 214. The L1, L2, and L3 caches may be combined instruction and data caches or correspond to separate instruction and data caches. In the illustrated embodiment, L2 cache 206 is further coupled to a fabric controller 208 that is coupled to a main memory controller (e.g., included in a Northbridge) 210, which supports a main memory subsystem 212 that, in various embodiments, includes an application appropriate amount of volatile and non-volatile memory. In alternative embodiments, fabric controller 208 may be omitted and, in this case, L2 cache 206 may be directly connected to main memory controller 210.

Fabric controller 208, when implemented, facilitates communication between different CMPs and between processors 204 and memory subsystem 212 and, in this manner, functions as an interface. As is further shown in FIG. 2, main memory controller 210 is also coupled to an I/O channel controller (e.g., included in a Southbridge) 216, which is coupled to a host channel adapter (HCA)/switch block 218. HCA/switch block 218 includes an HCA and one or more switches that may be utilized to couple CMP 202 to CMPs in other nodes (e.g., I/O subsystem nodes and processor nodes) of HPC cluster 100.

Figure 3:
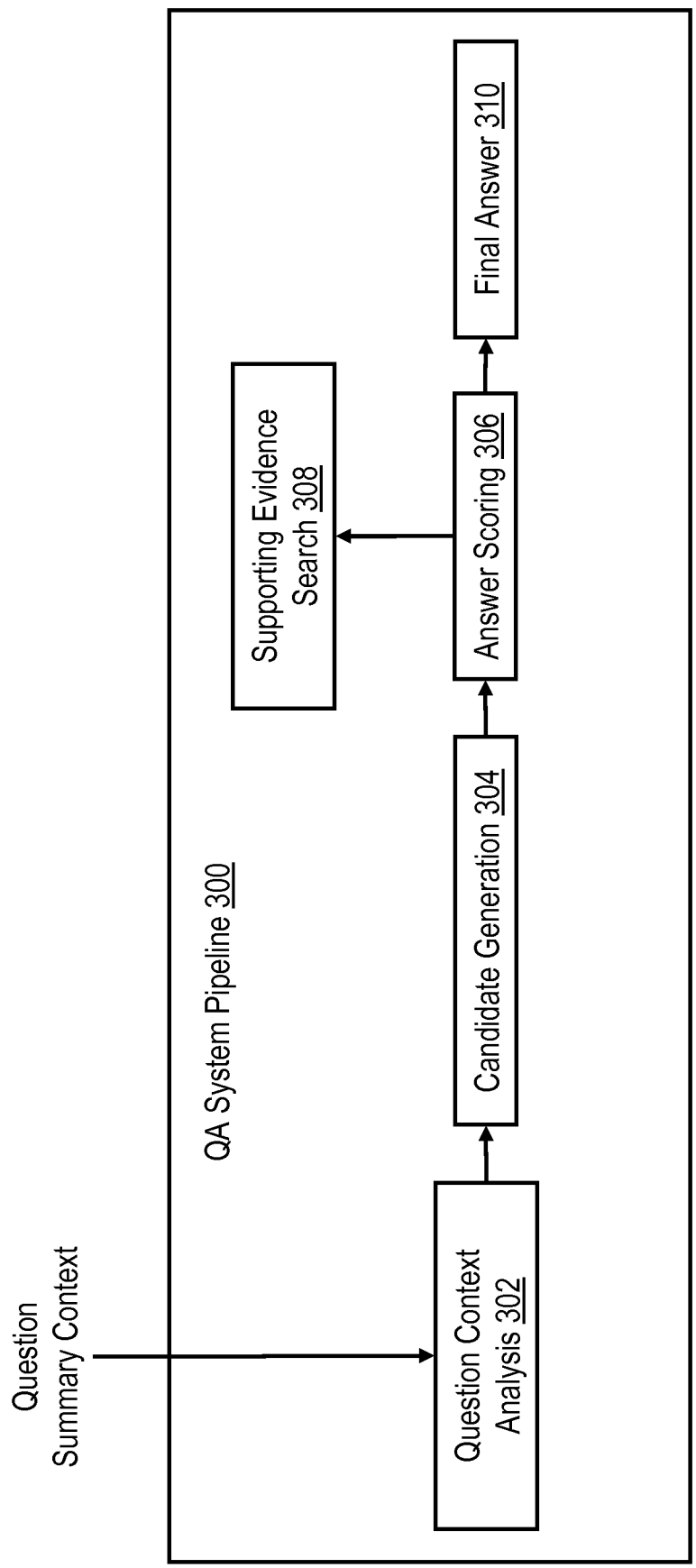
FIG. 3 depicts relevant components of an exemplary data processing system pipeline in the form of a question answering (QA) system pipeline.

FIG. 3 illustrates relevant components of a QA system pipeline for an exemplary QA system. As is illustrated in FIG. 3, a question context analysis block 302 of QA system pipeline 300 receives question summary contexts as inputs and generates outputs representing its analysis of the contexts. A candidate answer generation block 304 of QA system pipeline 300 receives the outputs from context analysis block 302 at an input and generates candidate answers. The candidate answers are provided to an input of a candidate answer scoring block 306, which is configured to initiate a supporting evidence search (by supporting evidence search block 308) in order to score the various candidate answers. The results of the scoring are provided to a final candidate answer block 310, which is configured to provide a final candidate answer based on the scoring of the candidate answers. It should be appreciated that blocks 302-310 may be implemented in program code executing on one or more processor cores or may be directly implemented in dedicated hardware (logic).

Figure 4:
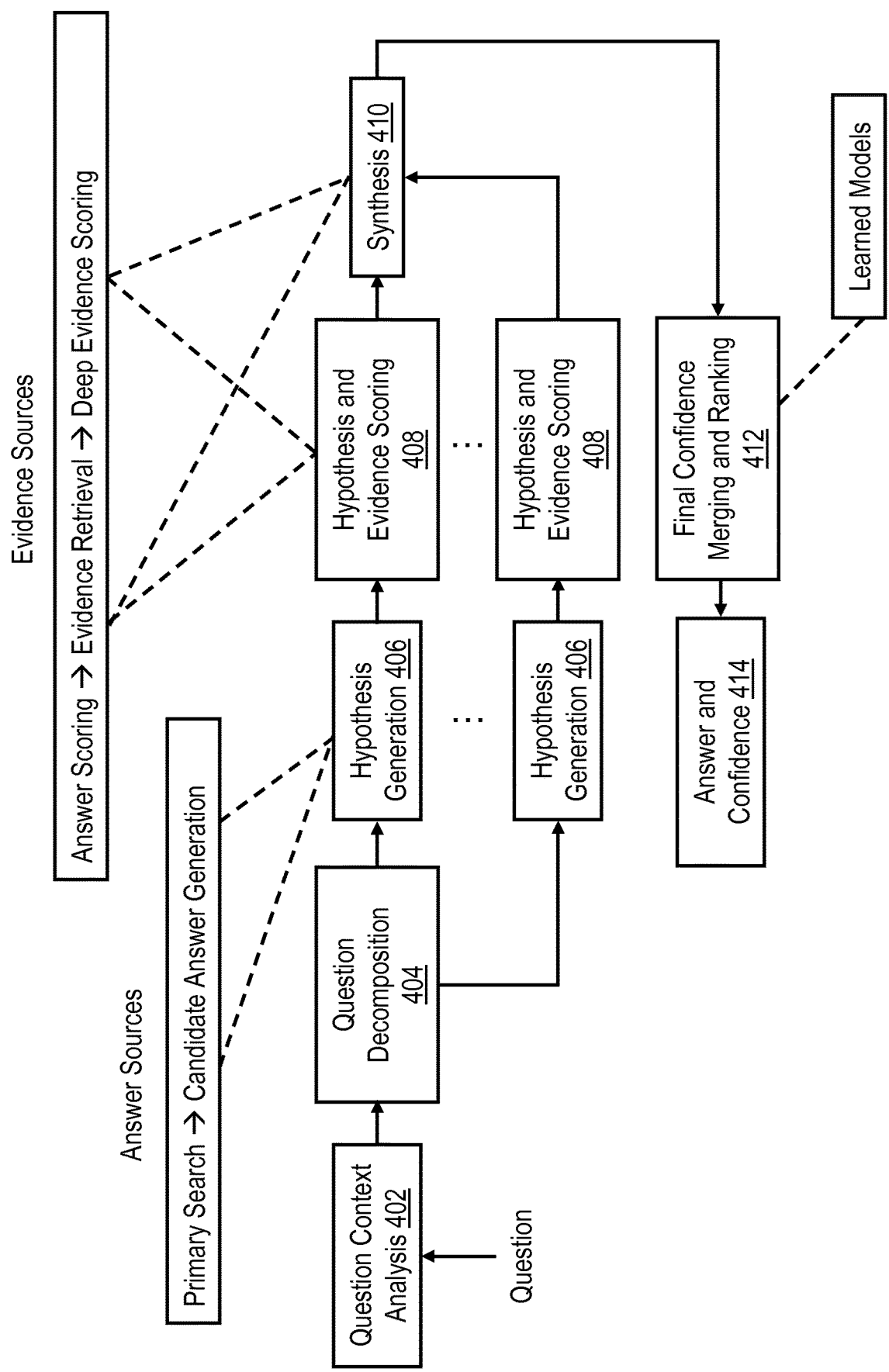
FIG. 4 depicts relevant components of the exemplary QA system pipeline of FIG. 3 in additional detail.

FIG. 4 illustrates relevant components of an exemplary QA system pipeline in additional detail. As is illustrated, question context analysis block 402 receives a question in a natural language. An output of block 402 is provided to a question decomposition block 404, which further analyzes the different textual, grammatical, linguistic, punctuation and/or other components of the question. Block 404 provides inputs to multiple hypothesis generation blocks 406, which perform parallel hypothesis generation for candidate answers. Hypothesis generation blocks 406 each perform a primary search, collect reference data from different structured and unstructured sources, and generate candidate answers. For example, data generated by hypothesis 'i' may be referenced as 'D_i', and data generated by hypothesis 'j' may be referenced as 'D_j'. The data 'D_i' and 'D_j' may be the same data, completely different data, or may include overlapping data.

As one example, a QA system pipeline may be configured, according to the present disclosure, to: receive a question; create 'N' hypotheses (1 . . . N) to find candidate answers (e.g., N=10); and load data for each hypothesis 'i' on which to operate into a shared cache. For example, assuming a shared cache across all hypotheses, 1/Nth of the shared cache may be loaded with data for each hypothesis to operate on. The QA system pipeline may be further configured to execute the 'N' hypotheses to return 'M' candidate answers (in this case, each hypothesis generates one or more candidate answers). For example, the notation 'ANS_i' may be employed to denote a set of candidate answers generated by hypothesis 'i'. In various embodiments, hypothesis and evidence scoring for each hypothesis is initiated in hypothesis and evidence scoring blocks 408. That is, the QA system pipeline is further configured to score all the candidate answers using hypothesis and evidence scoring techniques (e.g., providing 'M' scores for 'M' candidate answers). In synthesis block 410 the QA system pipeline evaluates the candidate answers with the highest scores and determines which hypotheses generated the highest scores.

Following block 410, the QA system pipeline initiates final confidence merging and ranking in block 412. Finally, in block 414, the QA system pipeline provides a single answer (and may provide a confidence score) for the question. Assuming, for example, the candidate answers 'j', 'k', and 'l' have the highest scores, a determination may then be made as to which of the hypotheses generated the best candidate answers. As one example, assume that hypotheses 'c' and 'd' generated the best candidate answers 'j', 'k', and 'l'. The QA system pipeline may then upload additional data required by hypotheses 'c' and 'd' into the cache and unload data used by other hypotheses from the cache. According to the present disclosure, the priority of what data is uploaded is relative to candidate answers scores (as such, hypotheses producing lower scores have less associated data in cache). When a new question is received, the above-described process is repeated. If the hypotheses 'c' and 'd' again produce best candidate answers, the QA system pipeline loads more data that is relevant to the hypotheses 'c' and 'd' into the cache and unloads other data.

If, on the other hand, hypotheses 'h' and 'g' produce the best candidate answers for the new question, the QA system pipeline loads more data relevant to the hypotheses 'h' and 'g' into the cache and unloads other data. It should be appreciated that, at this point, hypotheses 'c' and 'd' probably still have more data in the cache than other hypotheses, as more relevant data was previously loaded into the cache for the hypotheses 'c' and 'd'. According to the present disclosure, the overall process repeats in the above-described manner by basically maintaining data in the cache that scoring indicates is most useful. The disclosed process may be unique to a QA system pipeline when a cache controller is coupled directly to a scoring mechanism of the QA system pipeline.

Figure 5:
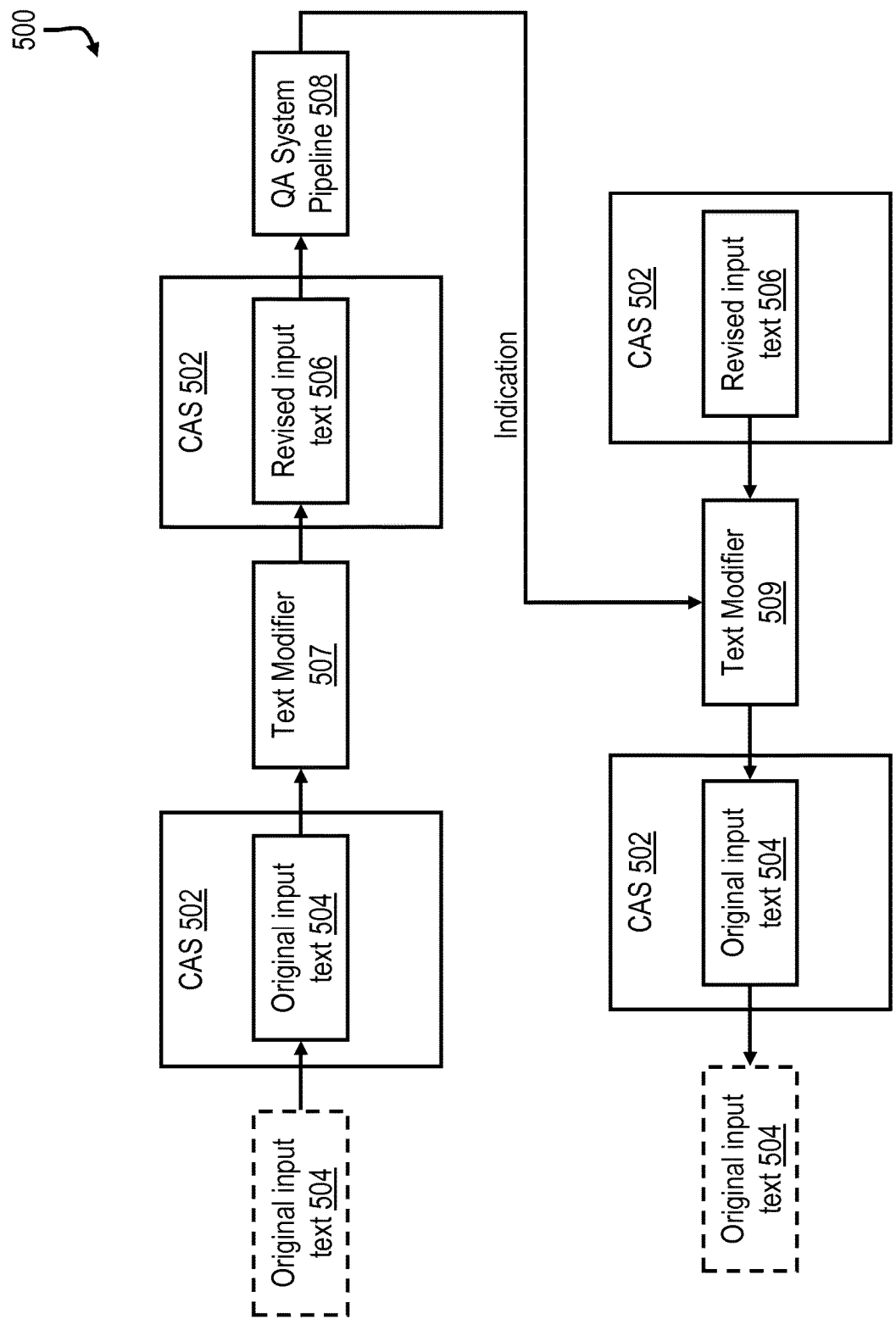
FIG. 5 is a diagram illustrating modification of supporting original input text according to an embodiment of the present disclosure.

With reference to FIG. 5, a diagram 500 illustrates modification of original input text, according to an embodiment of the present disclosure. Original input text 504 is received, along with an associated question (not illustrated in FIG. 5) by a QA system. As is shown, original input text 504 is stored in a CAS 502, which may, for example, be allocated in memory 212 of data processing system 200. A text modifier 507 is configured to perform corrective measures on original input text 504 to facilitate processing by a pipeline of the QA system. For example, corrective measures may correspond to spelling correction, abbreviation expansion, removing irrelevant information, changing anomalous forms to conforming forms, correcting bad grammar, and/or adding missing data. Text modifier 507 may, for example, be implemented in question context analysis block 402 of FIG. 4.

As is illustrated in FIG. 5, revised input text 506 is created (by text modifier 507) from original input text 504 that is associated with a question input by a user. As is shown, original input text 504 is stored in a common analysis structure (CAS) 502 for processing by QA system pipeline 508 (which may correspond to the QA system pipeline illustrated in FIG. 4). Text modifier 507 may, for example, be configured to implement various corrective measures (e.g., spelling correction, abbreviation expansion, removing irrelevant information, changing anomalous forms to conforming forms, correcting bad grammar, and/or adding missing data) on original input text 504 in creating revised input text 506. As one example, revised input text 506 may replace original input text 504 in a view in CAS 502. It should be appreciated that QA system pipeline 508 accesses revised input text 506 to answer the question associated with original input text 504.

Upon receiving an indication from QA system pipeline 508 that question analysis is complete and a final answer has been selected, a text modifier 509 recreates (based on annotations in revised input text 506) original input text 504 from revised input text 506 in CAS 502 and stores original input text 504 in CAS 502. Original input text 504 is then transmitted to the user that originally submitted the question, along with the answer to the question. Text modifier 509 may, for example, be implemented in answer and confidence block 414 of FIG. 4.

A user of a QA system may provide a question to the QA system that has an associated file with original input text that requires processing to answer the question. As one example, a user of a QA system may provide a healthcare insurance question (e.g., "Does patient 'A' qualify for procedure 'B'?") along with supporting information about a patient (e.g., patient 'A') that is utilized to answer the healthcare insurance question. An exemplary original input text file that includes personal health information for patient 'A' is illustrated in FIG. 6A (by Patient 'A'-supporting original input text file 600) and below.

Patient 'A'-supporting original input text file

---
<start>
The patient has a BMI of 3.2.
The patient has been vaccinated against hepatitis A and B.
The patient does not smoke The patient does not drink
The patient has been taking medicine 'A' for the past6months.
The patient's DOB:1990/2/48.
The patient's hemogoblin count is 11.5 gm/dl.
The patient's temperature was 98.7°.
<end>

---

For example, the personal health information within Patient 'A'-supporting original input text file 600 can represent or be derived from an electronic health record associated with patient 'A'.

An exemplary procedure 'B' file that may be utilized to determine whether patient 'A' qualifies for procedure 'B' is illustrated in FIG. 6C (by Procedure 'B' file 604) and below.

Procedure 'B' file

---
<start>
Patient body mass index must be less than 3.6.
Patient cannot smoke.
Patient cannot drink.

-continued

Patient must have been taking medicine 'A' for at least the past three months.
Patient must be less than 70 years old.
Patient's hemoglobin count must be between 11.0 gm/dl and 12.0 gm/dl.
Patient's temperature must be between 97.5 degrees and 99.7 degrees.
<end>

---

Abbreviation expansion for input text in a file may be achieved by processing the input text through an abbreviation expansion annotator that expands text for domain-specific abbreviations and acronyms (e.g., medical domain abbreviations and acronyms). The abbreviations are then replaced with associated replacement text. For example, in the Patient 'A'-supporting original input text file above an abbreviation expansion annotator may expand the phrase 'The patient has a BMI of 3.2.' to 'The patient has a body mass index of 3.2.' in the Patient 'A'-supporting revised input text file below. In one or more embodiments, input text is evaluated for wording and/or phrases that are not relevant for processing and annotations can be implemented such that irrelevant text can be ignored based on domain requirements. In this case, annotations are used to ignore text such that remaining annotators in a QA system pipeline do not have to check the text annotated to be ignored. For example, in the Patient 'A'-supporting original input text file 600 reproduced above the phrase "The patient has been vaccinated against hepatitis A and B." can be ignored (as the phrase is irrelevant as to whether patient 'A' qualifies for procedure 'B').

In many cases, free-form input text may contain poor grammar, e.g., run-on sentences, no punctuation, and outline type formats. Poor grammar produces poor language parsing results and, thus, poor scoring. A grammar annotator attempts to correct grammatical errors, informalities, and irregularities. In general, a pattern searches for resulting bad parses and attempts to fix bad areas of text. The most common example of poor grammar is run-on sentences. According to the present disclosure, in the case of run-on sentences period delimiters are inserted in appropriate places to obtain valid language parses. For example, in Patient 'A'-supporting original input text file 600 the phrases "The patient does not smoke The patient does not drink" are corrected to "The patient does not smoke. The patient does not drink." by inserting a period.

Data anomalies may also be corrected by a data anomaly annotator. For example, in the Patient 'A' supporting original input text file above the sentence 'The patient has been taking the medicine for the past6months.' is corrected to 'The patient has been taking the medicine for the past 6 months.' As an example of abbreviation expansion and data anomaly correction in the Patient 'A' supporting original input text file above, the sentence 'The patient's DOB:1990 Feb. 28.' is changed to 'The patient's date of birth: 1990 Feb. 28.' by expanding the acronym 'DOB' and adding a space between the colon and the date '1990 Feb. 28'.

As another example of a data anomaly correction in Patient 'A'-supporting original input text file 600, the phrase "The patient's hemogoblin count is 11.5 gm/dl." after spelling correction reads "The patient's hemoglobin count is 11.5 gm/dl." As another example of a data anomaly correction in Patient 'A'-supporting original input text file 600, the phrase "The patient's temperature was 98.7°." after substituting the word degrees for the degree symbol (i.e., replacing non-ASCII characters) reads "'The patient's temperature was 98.7 degrees." In general, for data anomalies temporal processing may use an array of patterns to identify dates and times within text. The temporal data is annotated accordingly then used to create annotations for implicit and explicit durations. As one example, dates and times in text are sometimes written such that temporal patterns do not activate and, as such, date and time annotations are not created. The 'DOB' and 'past6months' examples illustrate cases where temporal patterns may not activate.

In the supporting revised input text file illustrated below deletions are illustrated using strike-through and additions are illustrated using underlining.

Patient 'A'-supporting revised input text file

---

<start>
The patient has a ~~BMI~~ body mass index of 3.2.
~~The patient has been vaccinated against hepatitis A and B.~~
The patient does not smoke._ The patient does not drink_.
The patient has been taking medicine 'A' for the ~~past6months~~ past 6 months.
The patient's ~~DOB~~ date of birth:_ 1990/2/48.
The patient's ~~hemogoblin~~ hemoglobin count is 11.5 gm/dl.
The patient's temperature was ~~98.7°~~ 98.7 degrees.
<end>

---

It should be appreciated that annotations may take various forms and are not limited to strike-through and underlining. As one example, in FIG. 6B, deletions are illustrated using italics and additions are illustrated using underlining in Patient 'A'-supporting revised input text file 602.

An output provided by a QA system, configured according to one or more embodiments of the present disclosure, may take the following form.

You asked "Does patient 'A' qualify for procedure 13'?"

Based on the information below (provided by you in the 'Patient 'A'-supporting original input text file'), Patient 'A' qualifies for procedure 'B'.

Patient 'A'-supporting original input text file

---

<start>
The patient has a BMI of 3.2.
The patient has been vaccinated against hepatitis A and B.
The patient does not smoke The patient does not drink
The patient has been taking medicine 'A' for the past6months.
The patient's DOB:1990/2/48.
The patient's hemogoblin count is 11.5 gm/dl.
The patient's temperature was 98.7°.
<end>

---

An output provided by a QA system, configured according to one or more embodiments of the present disclosure, may identify (e.g., highlight) selected information that was utilized in the decision making process. As one example, highlighting of information that was utilized in the decision making process may take the form of bolded text as is illustrated in Patient 'A' highlighted supporting original input text file 606 of FIG. 6D and set forth below.

Patient 'A'-supporting original input text file

---

<start>
The patient has a BMI of 3.2.
The patient has been vaccinated against hepatitis A and B.
The patient does not smoke The patient does not drink
The patient has been taking medicine 'A' for the past6months.
The patient's DOB:1990/2/48.
The patient's hemogoblin count is 11.5 gm/dl.
The patient's temperature was 98.7°.
<end>

---

It should be appreciated that approaches other than bolding may be utilized to highlight information that was considered in answering the user question.

Figure 7:
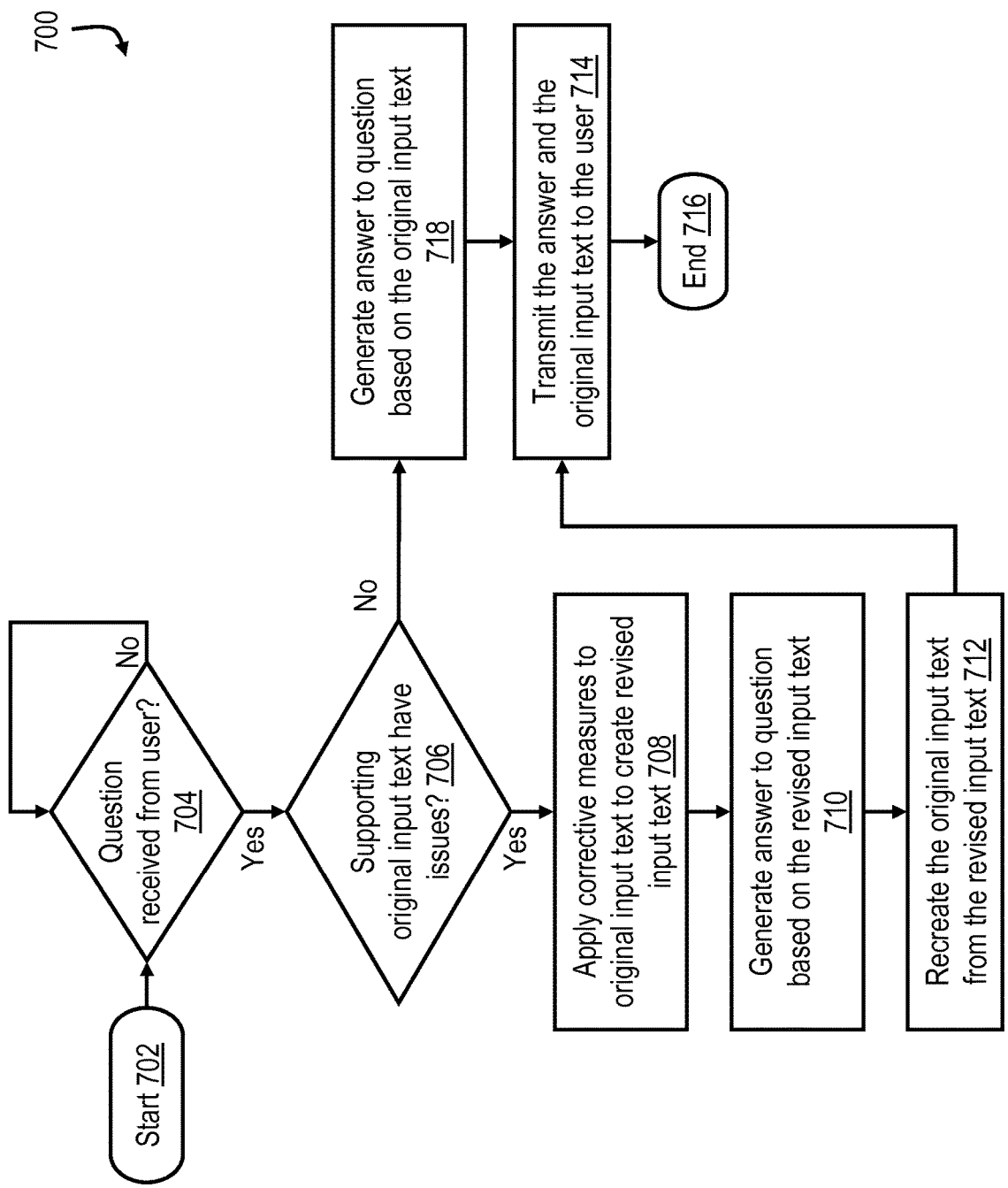
FIG. 7 is a flowchart of an exemplary process for input text processing in a data processing system that answers questions, according to an embodiment of the present disclosure.

With reference to FIG. 7, an exemplary process 700 for input text processing in a data processing system that answers questions, according to an embodiment of the present disclosure, is illustrated. Process 700 may be, for example, executed by one or more data processing systems 200 that implement a QA system, as discussed above. In block 702 process 700 is initiated, e.g., in response to data processing system 200 receiving input from a user. Next, in decision block 704 data processing system 200 determines whether the input is a user question. For example, a user may input a question asking whether a specific patient qualifies for a specific medical procedure (e.g., "Does Patient 'A' qualify for Procedure 'B'?"). In response to the input not corresponding to a user question control loops on block 704. In response to the input corresponding to a user question control transfers from block 704 to decision block 706.

In block 706, data processing system 200 analyzes supporting original input text in a supporting original input text file to determine whether the supporting original input text has issues that need to be addressed before further QA system pipeline processing. In response to the supporting original input text having issues that need to be addressed before further QA system pipeline processing in block 706, control transfers to block 708, where data processing system 200 applies corrective measures (e.g., spelling correction, abbreviation expansion, removing irrelevant information, changing anomalous forms to conforming forms, correcting bad grammar, and/or adding missing data) to the original input text to create revised input text that does not have issues that may cause QA system pipeline processing problems. Then, in block 710, data processing system 200, generates an answer to the question based on the revised input text. Next, in block 712, data processing system 200 recreates (using annotations in the revised input text) the original input text from the revised input text. Then, in block 714, data processing system 200 transmits the answer and the recreated original input text to the user. As one example, information utilized in answering the question may be highlighted in the original input text transmitted to the user. From block 714 control transfers to block 716, where process 700 terminates.

In response to the supporting original input text not having issues that need to be addressed before further QA system pipeline processing in block 706, control transfers to block 718, where data processing system 200 generates an answer to the question based on the original input text. From block 718 control transfers to block 714, where data processing system 200 transmits the answer and the original input text to the user, and then to block 716 where process 700 terminates.

Accordingly, techniques have been disclosed herein that advantageously improve input text processing in a data processing system that answers questions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A method of improving input text processing in a data processing system that answers questions, comprising:
   receiving, by a data processing system, a question from a user, wherein the question has associated supporting original input text that exhibits one or more issues that prevent the data processing system from processing the supporting original input text to provide an answer to the question, wherein the issues that prevent the data processing system from processing the supporting original input text include abbreviations, irrelevant information, misspelled words, anomalies, and bad grammar in the supporting original input text;
   applying, by the data processing system, one or more corrective measures to the supporting original input text to create supporting revised input text that corrects the issues that prevented the data processing system from processing the supporting original input text, wherein the supporting revised input text documents the corrective measures applied to the supporting original input text which is pulled from a common analysis structure (CAS), and wherein patterns are applied to the supporting original input text to produce the supporting revised input text which is used to create a new CAS for processing by the data processing system;
   generating, by the data processing system, an answer to the question based on the supporting revised input text from the new CAS, wherein creation of the supporting revised input text improves the ability of the data processing system to generate the answer to the question by addressing the issues in the supporting original input text prior to processing the supporting revised input text to generate the answer;
   recreating, by the data processing system, the supporting original input text from the supporting revised input text based on the documented corrective measures in the supporting revised input text subsequent to generating the answer; and
   transmitting, by the data processing system, the answer and the supporting original input text as recreated, from the supporting revised input text based on the documented corrective measures, to the user.

2. The method of claim 1, further comprising:
   storing the supporting revised input text in the new CAS.

3. The method of claim 2, further comprising:
   performing natural language processing (NLP) on the supporting revised input text in the new CAS to generate the answer.

4. The method of claim 1, further comprising:
   highlighting information in the recreated supporting original input text that was utilized to generate the answer.

5. The method of claim 1, wherein the corrective measures include spelling correction and abbreviation expansion.

6. The method of claim 1, wherein the corrective measures include at least one of spelling correction, abbreviation expansion, removing irrelevant information, changing anomalous forms to conforming forms, correcting bad grammar, and adding missing data.

7. A computer program product configured for improving input text processing in a data processing system that answers questions, comprising:
   a computer-readable storage device; and
   computer-readable program code embodied on the computer-readable storage device, wherein the computer-readable program code, when executed by a data processing system, causes the data processing system to:
   receive a question from a user, wherein the question has associated supporting original input text that exhibits one or more issues that prevent the data processing system from processing the supporting original input text to provide an answer to the question, wherein the issues that prevent the data processing system from processing the supporting original input text include abbreviations, irrelevant information, misspelled words, anomalies, and bad grammar in the supporting original input text;
   apply one or more corrective measures to the supporting original input text to create supporting revised input text that corrects the issues that prevented the data processing system from processing the supporting original input text, wherein the supporting revised input text documents the corrective measures applied to the supporting original input text which is pulled from a common analysis structure (CAS), and wherein patterns are applied to the supporting original input text to produce the supporting revised input text which is used to create a new CAS for processing by the data processing system;
   generate an answer to the question based on the supporting revised input text from the new CAS, wherein creation of the supporting revised input text improves the ability of the data processing system to generate the answer to the question by addressing the issues in the supporting original input text prior to processing the supporting revised input text to generate the answer;
   recreate the supporting original input text from the supporting revised input text based on the documented corrective measures in the supporting revised input text subsequent to generating the answer; and
   transmit the answer and the supporting original input text as recreated, from the supporting revised input text based on the documented corrective measures, to the user.

8. The computer program product of claim 7, wherein the computer-readable program code, when executed by the data processing system, further causes the data processing system to:
store the supporting revised input text in the new CAS.

9. The computer program product of claim 8, wherein the computer-readable program code, when executed by the data processing system, further causes the data processing system to:
perform natural language processing (NLP) on the supporting revised input text in the new CAS to generate the answer.

10. The computer program product of claim 7, wherein the computer-readable program code, when executed by the data processing system, further causes the data processing system to:
highlight information in the recreated supporting original input text that was utilized to generate the answer and is transmitted to the user.

11. The computer program product of claim 7, wherein the corrective measures include spelling correction and abbreviation expansion.

12. The computer program product of claim 7, wherein the corrective measures include at least one of spelling correction, abbreviation expansion, removing irrelevant information, changing anomalous forms to conforming forms, correcting bad grammar, and adding missing data.

13. A data processing system, comprising:
a cache memory; and
a processor coupled to the cache memory, wherein the processor is configured to:
receive a question from a user, wherein the question has associated supporting original input text that exhibits one or more issues that prevent the data processing system from processing the supporting original input text to provide an answer to the question, wherein the issues that prevent the data processing system from processing the supporting original input text include abbreviations, irrelevant information, misspelled words, anomalies, and bad grammar in the supporting original input text;
apply one or more corrective measures to the supporting original input text to create supporting revised input text that corrects the issues that prevented the data processing system from processing the supporting original input text, wherein the supporting revised input text documents the corrective measures applied to the supporting original input text which is pulled from a common analysis structure (CAS), and wherein patterns are applied to the supporting original input text to produce the supporting revised input text which is used to create a new CAS for processing by the data processing system;
generate an answer to the question based on the supporting revised input text from the new CAS, wherein creation of the supporting revised input text improves the ability of the data processing system to generate the answer to the question by addressing the issues in the supporting original input text prior to processing the supporting revised input text to generate the answer;
recreate the supporting original input text from the supporting revised input text based on the documented corrective measures in the supporting revised input text subsequent to generating the answer; and
transmit the answer and the supporting original input text as recreated, from the supporting revised input text based on the documented corrective measures, to the user.

14. The data processing system of claim 13, wherein the processor is further configured to:
store the supporting revised input text in the new CAS.

15. The data processing system of claim 14, wherein the processor is further configured to:
perform natural language processing (NLP) on the supporting revised input text in the new CAS to generate the answer.

16. The data processing system of claim 13, wherein the processor is further configured to:
highlight information in the recreated supporting original input text that was utilized to generate the answer and is transmitted to the user.

17. The data processing system of claim 13, wherein the corrective measures include at least one of spelling correction, abbreviation expansion, removing irrelevant information, changing anomalous forms to conforming forms, correcting bad grammar, and adding missing data.

* * * * *